(12) United States Patent
Cidonio et al.

(10) Patent No.: US 11,919,663 B2
(45) Date of Patent: Mar. 5, 2024

(54) ESTIMATION OF ATTITUDE AND ANGULAR VELOCITY OF A SATELLITE BASED ON THE USE OF ONLY OPTICAL SENSORS

(71) Applicant: ARCA DYNAMICS SOCIETA' A RESPONSABILITA' LIMITATA SEMPLIFICATA, Rome (IT)

(72) Inventors: Emanuele Cidonio, Rome (IT); Fabio Curti, Rome (IT); Daniele Luchena, Rome (IT); Marco Moriani, Rome (IT); Dario Spiller, Rome (IT)

(73) Assignee: ARCA DYNAMICS SOCIETA' A RESPONSABILITA' LIMITATA SEMPLIFICATA, Rome (IT)

( * ) Notice: Subject to any disclaimer, the term of this patent is extended or adjusted under 35 U.S.C. 154(b) by 266 days.

(21) Appl. No.: 17/423,003

(22) PCT Filed: Jan. 15, 2020

(86) PCT No.: PCT/IB2020/050309
§ 371 (c)(1),
(2) Date: Jul. 14, 2021

(87) PCT Pub. No.: WO2020/148676
PCT Pub. Date: Jul. 23, 2020

(65) Prior Publication Data
US 2022/0084217 A1    Mar. 17, 2022

(30) Foreign Application Priority Data
Jan. 15, 2019   (IT) ................. 102019000000619

(51) Int. Cl.
*B64G 1/24*    (2006.01)
*B64G 1/36*    (2006.01)
*G01C 21/02*    (2006.01)

(52) U.S. Cl.
CPC ............. *B64G 1/244* (2019.05); *B64G 1/361* (2013.01); *G01C 21/025* (2013.01); *B64G 1/245* (2023.08)

(58) Field of Classification Search
CPC ......... G06T 7/277; G06T 7/246; G06T 7/248; G06T 2207/10032; G06T 2207/10016;
(Continued)

(56) References Cited

U.S. PATENT DOCUMENTS

| | | | |
|---|---|---|---|
| 11,046,463 B1* | 6/2021 | Dallmann | B64G 1/361 |
| 2006/0197664 A1* | 9/2006 | Zhang | G06T 7/246 |
| | | | 250/221 |
| 2014/0236401 A1* | 8/2014 | Tsao | B64G 3/00 |
| | | | 701/13 |

OTHER PUBLICATIONS

Liu; "Angular velocity estimation from measurement vectors of star tracker"; Applied Optics; vol. 51, No. 16; 2012; pp. 3590-3598 (Year: 2012).*

(Continued)

*Primary Examiner* — Stephen Holwerda
(74) *Attorney, Agent, or Firm* — KLINTWORTH & ROZENBLAT IP LLP

(57) ABSTRACT

The invention concerns a method for estimating the angular velocity (and, preferably, also the attitude) of a space platform (for example, a satellite, a space vehicle, or a space station) using only the information provided by one or more optical sensors, such as one or more star trackers, one or more colour and/or black and white cameras or video cameras, one of more infrared sensors, etc.

16 Claims, 5 Drawing Sheets

(58) Field of Classification Search
CPC .. B64G 1/361; B64G 1/244; B64G 2001/245; G01C 21/025
See application file for complete search history.

(56) References Cited

OTHER PUBLICATIONS

Ning; "Spacecraft angular velocity estimation method using optical flow of stars"; Science China Information Sciences; vol. 61; 2018; 112203:1-112203:14 (Year: 2018).*

International Search Report and Written Opinion of the International Searching Authority, dated Mar. 18, 2020, in connection with International Application No. PCT/IB2020/050309 (15 pages).

John L. Crassidis, "Angular Velocity Determination Directly from Star Tracker Measurements", Journal of Guidance and Control and Dynamics, US, vol. 25, No. 6, Nov. 1, 2002, pp. 1165-1168 (12 pages).

Carl Christian Liebe et al, "Toward a Steller Gyroscope for Spacecraft Attitude Determination", Journal of Guidance and Control and Dynamics, US, vol. 27, No. 1, Jan. 1, 2004, pp. 91-99 (9 pages).

Domenico Accardo et al, "A Procedure for Three-Dimensional Angular Velocity Determination Using a Star Sensor in High-Rate Rotation Modes", Acta Astronautica, GB, vol. 48, No. 5-12, Mar. 1, 2001, pp. 311-320 (10 pages).

Vincenzo Caglioti et al, "Recovering Ball Motion From a Single Motion-Blurred Image", Computer Vision and Image Understanding, Academic Press, US, vol. 113, No. 5, May 1, 2009, pp. 590-597 (8 pages).

Giancarmine Fasano et al, "Satellite Angular Velocity Estimation Based on Star Images and Optical Flow Techniques", Sensors, vol. 13, No. 10, Sep. 25, 2013, pp. 12771-12793 (24 pages).

* cited by examiner

ESTIMATION OF ATTITUDE AND ANGULAR VELOCITY OF A SATELLITE BASED ON THE USE OF ONLY OPTICAL SENSORS

CROSS-REFERENCE TO RELATED APPLICATIONS

This patent application claims priority from Italian patent application no. 102019000000619 filed on 15 Jan. 2019, the entire disclosure of which is incorporated herein by reference.

TECHNICAL FIELD OF THE INVENTION

The present invention relates to a methodology for estimating the angular velocity (and, preferably, also the attitude) of a space platform (e.g. a satellite, a space vehicle, or a space station) using only the information provided by one or more optical sensors, such as one or more star trackers, one or more colour and/or black and white cameras or video cameras, one or more infrared sensors, etc.

In this regard, it is important to draw attention to the fact that in the following the invention will be described by making explicit reference to the use of one or more star trackers, it being understood that this invention can also, however, be made using other types of optical sensors.

STATE OF THE ART

As is well known, star trackers are optical devices used on board satellites to determine, with extreme precision, the attitude of satellites in orbit. The attitude information provided by the star trackers is generally used by on-board systems for attitude control, guidance, and navigation.

In order to determine the attitude of a satellite, a star tracker installed on board said satellite is typically configured for:
- acquiring images of the star field observable by said star tracker at visible and near-infrared wavelengths;
- identifying geometric patterns of potential stars in the acquired images;
- comparing the geometric patterns identified with a predefined, stored star catalogue, in order to determine the stars actually observed; and
- computing the satellite's attitude in relation to the stars actually observed.

On the other hand, today the estimation of the angular velocity of satellites is typically entrusted to very accurate gyroscopic sensors that, however, also have several disadvantages, for example:
- they are generally affected by a non-constant measurement bias that requires a special filter;
- they entail very high costs (in particular, much higher than those of star trackers);
- they require space for installation and increase the complexity of on-board guidance, navigation, and attitude control systems, since they are very sophisticated and complex electronic devices (as opposed to star trackers) that must be housed inside satellites.

Although in the past the use of star trackers was proposed for the estimation of angular velocity, to date no practical use of star trackers is known for measuring satellites' motion around their centre of mass. In other words, today's use of star trackers still seems to be limited to attitude estimation alone.

In any case, as previously explained, studies have been published in the past that present the possibility of using star trackers to also measure the angular velocity of satellites or space vehicles, by exploiting the correlation of the position of the same star in different time instants, i.e., in images acquired by star trackers at different time instants.

In this regard, reference may be made to:
- J. L. Crassidis, "*Angular Velocity Determination Directly from Star Tracker Measurements*", Journal of Guidance, Control, and Dynamics, Vol. 25, No. 6, 2002, pp. 1165-1168 (hereinafter referred to, for brevity, as Crassidis); and
- P. Singla, J. L. Crassidis, J. L. Junkins, "*Spacecraft angular rate estimate algorithms for star tracker-based attitude determination*", Advances in the Astronautical Sciences, Vol. 114, 2003, pp. 1303-1316 (hereinafter referred to, for brevity, as Singla).

In particular, Crassidis describes a method for determining the angular velocity of a space vehicle (i.e., "spacecraft") using a least squares approach based only on the knowledge of the star versors (i.e. the unit vectors indicative of the position of the stars in the star tracker reference system or, equivalently, in the space vehicle reference system) directly provided by a star tracker, regardless of the knowledge of the attitude of the space vehicle and the reference star vectors. In particular, Crassidis presents three methods based, respectively, on an approximation to the first-order finite differences, an approximation to the central differences, and an approximation to the second-order finite differences.

Singla, on the other hand, describes two methods for estimating the angular velocity of a space vehicle based on data provided by a star tracker. In particular, a first method makes it possible to estimate the angular velocity and attitude, by using a dynamic model of the space vehicle. A second method, instead, is based on Crassidis's work and exploits a star tracker's high frequency of image acquisition (in the original text: "rapid update rate of the star camera") to estimate the angular velocity regardless of the attitude. Essentially, the second method, according to Singla, exploits an analysis of the finite differences of the stars' trajectories in the stream of images acquired by a star tracker to create a Kalman filter that can recursively estimate the angular velocity based on the star versors provided by said star tracker. A significant advantage of this second method is that any errors in attitude estimation have no impact on angular velocity estimation.

In addition, U.S. Pat. No. 9,073,648 B2 describes a solution that is based on the work of Singla and Crassidis and uses star tracker measurements and Kalman filtering to obtain three-axis velocity estimates of a spacecraft. These estimates can be used to check the attitude of a satellite or to calibrate a velocity sensor, such as a gyroscope.

In particular, U.S. Pat. No. 9,073,648 B2 describes two methods for estimating a three-axis attitude and velocity of a spacecraft in a reference system of said spacecraft, wherein a first method uses attitude data in estimating velocity, while a second method does not use them.

In detail, the first method according to U.S. Pat. No. 9,073,648 B2 comprises:
a) measuring star vectors at a plurality of time instants using a star tracker attached to a spacecraft;
b) calculating a respective quaternion from a spacecraft reference system to an Earth-centred inertial reference system for each time instant based on information derived from said measured star vectors;
c) calculating spacecraft velocities based on the quaternions computed in step b);
d) applying forward Kalman filtering to the calculated spacecraft velocities;

e) applying Kalman backward filtering to the calculated spacecraft velocities;

f) averaging the results of the steps d) and e) to produce average velocity estimates;

g) selecting one of the average velocity estimates or computing a velocity estimate that is a function of two or more of the average velocity estimates;

h) calculating a three-axis attitude of the spacecraft based on the velocity estimate selected or computed in the step g).

On the contrary, the second method according to U.S. Pat. No. 9,073,648 B2 comprises:

a) measuring star vectors on an image plane at a plurality of time instants using a star tracker attached to a spacecraft;

b) calculating respective spacecraft velocities at said time instants based on the measurements of the star vectors without using attitude information;

c) applying forward Kalman filtering to the computed spacecraft velocities;

d) applying backward Kalman filtering to the computed spacecraft velocities;

e) averaging the results of the steps c) and d) to produce average velocity estimates;

f) selecting one of the average velocity estimates or computing a velocity estimate that is a function of two or more of the average velocity estimates;

g) computing a three-axis attitude of the spacecraft based on the estimated velocity selected or computed in the step f).

However, U.S. Pat. No. 9,073,648 B2 does not clarify what the operational range is within which the two methods can provide reliable measurements, nor does it provide any estimate of the measurement error.

In particular, the second method according to U.S. Pat. No. 9,073,648 B2 is based directly on Crassidis's work and on the second method according to Singla that, however, are applicable to very low motion values, typically below 1 degree per second. In this respect, it is important to note that Singla makes explicit reference to the concept of "rapid update rate of the star camera", which implies that the second method according to Singla and, therefore, also the work of Crassidis, as well as the second method according to U.S. Pat. No. 9,073,648 B2, are applicable to motion values above 1 degree per second only if the star tracker's measurement frequency is significantly increased. However, this performance requires a considerable technological improvement, as today's star trackers reach operating frequencies of a maximum of 10 Hz.

OBJECT AND SUMMARY OF THE INVENTION

Object of the present invention is to provide a method for estimating angular velocity of a space platform (e.g. a satellite, space vehicle, spacecraft, or space station) in an extremely accurate, precise, and reliable manner based on information provided only by one or more optical sensors (e.g. one or more star trackers, or colour and/or black and white cameras or video cameras, or infrared sensors, etc.). This method is independent of the operating frequency of the optical sensor(s) and provides an accuracy and precision of angular velocity estimate so that the use of gyroscopes is unnecessary (with all the associated advantages in terms of lower costs, smaller dimensions, less complexity of guidance, navigation, and attitude control systems, and reduced measurement errors).

This and other objects are achieved by the present invention as it relates to a method for estimating an angular velocity of a space platform equipped with at least one optical sensor, as defined in the attached claims.

BRIEF DESCRIPTION OF THE DRAWINGS

In order to better understand the present invention, some preferred embodiments thereof will now be illustrated by way of non-limiting example with reference to the appended drawings (not to scale) wherein.

DETAILED DESCRIPTION OF PREFERRED EMBODIMENTS OF THE PRESENT INVENTION

The following description is provided to enable a person skilled in the art to implement and use the invention.

Various modifications to the embodiments presented will be immediately apparent to persons skilled in the art and the general principles described may be applied to other embodiments and applications while remaining within the scope of protection of the present invention, as defined in the appended claims.

As explained above, in the following the invention will be described by making explicit reference, only for simplicity of description, to the use of one or more star trackers, it being understood that what the present invention teaches can be advantageously exploited, mutatis mutandis, with other types of optical sensors as well (such as, for example, one or more colour and/or black and white cameras or video cameras, one of more infrared sensors, etc.).

Figure 1:
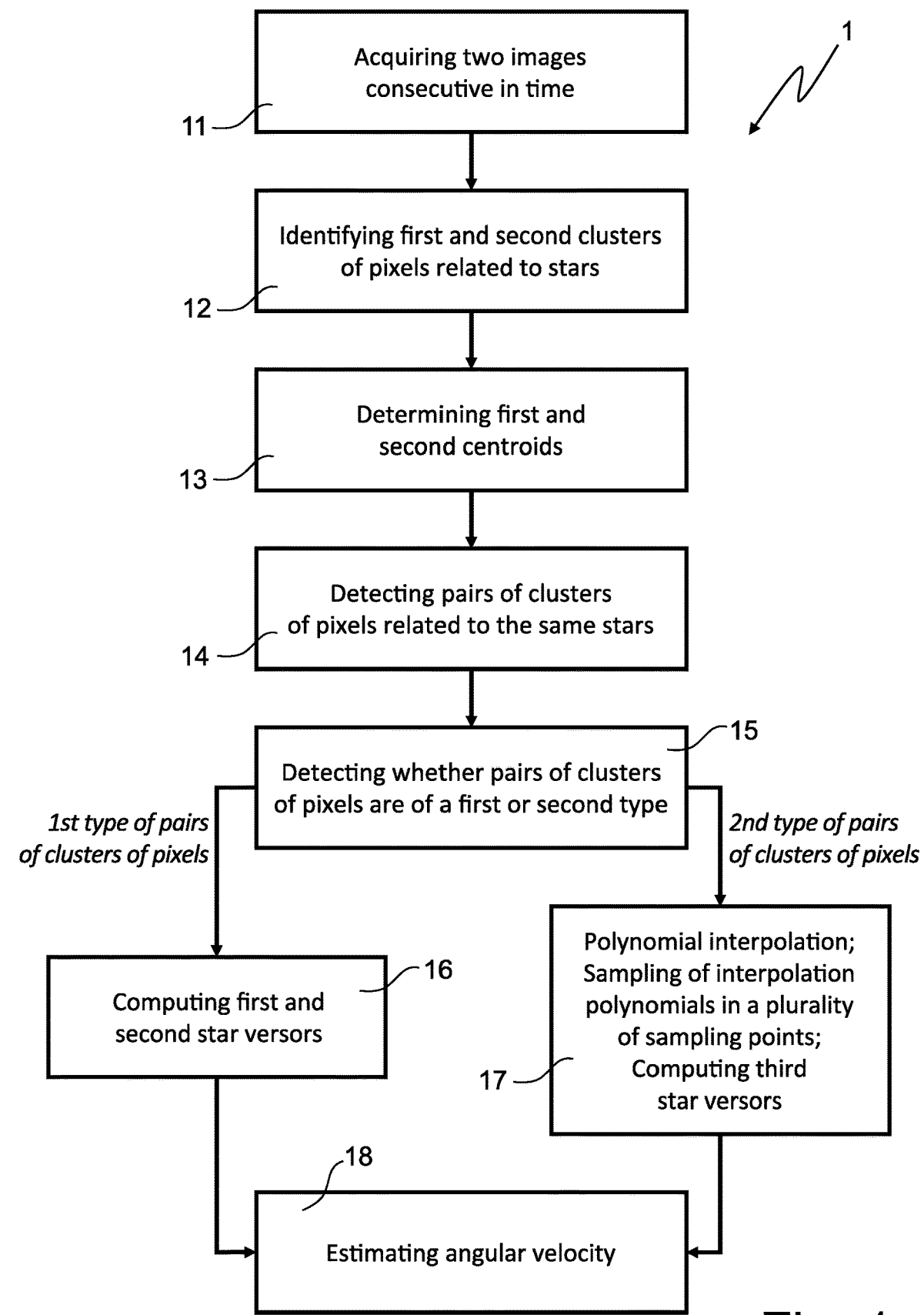
FIG. 1 schematically shows a method for estimating an angular velocity of a space platform equipped with at least one star tracker, according to a preferred embodiment of the present invention.

FIG. 1 schematically shows a method (referred to, as a whole, with reference numeral 1) for estimating an angular velocity of a space platform (e.g. a satellite, space vehicle, spacecraft, or space station, etc.) equipped with at least one star tracker, according to a preferred embodiment of the present invention.

In particular, the method 1 comprises:

a) acquiring, by means of the star tracker, a first image and a second image, wherein the first image is related to a first time instant $t_k$ and the second image is related to a second time instant $t_{k+1}$ following the first time instant $t_k$ (block 11 in FIG. 1);

b) identifying, based on pixel intensities in the first image acquired, first clusters of pixels related, each, to a respective star (block 12 in FIG. 1);

c) determining, for each first cluster of pixels, a respective first centroid (conveniently, by means of a weighted average taking into account the positions and intensities of the pixels belonging to said first cluster—block 13 in FIG. 1);

d) identifying, based on pixel intensities in the second image acquired, second clusters of pixels related, each, to a respective star (block 12 in FIG. 1);

e) determining, for each second cluster of pixels, a respective second centroid (conveniently, by means of a weighted average taking into account the positions and intensities of the pixels belonging to said second cluster—block 13 in FIG. 1);

f) detecting pairs of clusters of pixels comprising, each, a respective first cluster of pixels and a respective second cluster of pixels both related to the same star (block 14 in FIG. 1);

g) for each pair of clusters of pixels detected, detecting whether said pair of clusters of pixels is of a first predefined type or of a second predefined type (block 15 in FIG. 1);

h) for each pair of clusters of pixels of the first predefined type, computing
a respective first star versor based on the respective first centroid of the respective first cluster of pixels, and
a respective second star versor based on the respective second centroid of the respective second cluster of pixels;
(block 16 in FIG. 1)

i) for each pair of clusters of pixels of the second predefined type,
performing a polynomial interpolation of said pair of clusters of pixels thereby obtaining a respective interpolation polynomial that interpolates the respective first cluster of pixels and the respective second cluster of pixels,
sampling said respective interpolation polynomial in a plurality of sampling points and,
for each sampling point, computing a respective third star versor;
(block 17 in FIG. 1)

j) estimating an angular velocity of the space platform based on the first, second, and third star versors computed, thereby obtaining an angular velocity estimate $\hat{\omega}$ related to the first time instant $t_k$ (block 18 in FIG. 1).

Preferably, the step g) (i.e. block 15 in FIG. 1) includes detecting that a pair of clusters of pixels is of the first or second predefined type based on a distance or displacement (for example, expressed in terms of number of pixels) between the respective first centroid of the respective first cluster of pixels and the respective second centroid of the respective second cluster of pixels.

Conveniently, the step g) (i.e. block 15 in FIG. 1) includes detecting that a pair of clusters of pixels is of the first or second predefined type if the distance/displacement (for example, expressed in terms of number of pixels) between the respective first centroid of the respective first cluster of pixels and the respective second centroid of the respective second cluster of pixels is, respectively, smaller or greater than a first predefined threshold (for example, a first threshold defined as a first predefined number of pixels).

Preferably, the step f) (i.e. block 14 in FIG. 1) includes detecting that a first cluster of pixels and a second cluster of pixels are related to the same star based on a distance or a displacement (for example, expressed in terms of number of pixels) between the respective first centroid of said first cluster of pixels and the respective second centroid of said second cluster of pixels.

Conveniently, the step f) (i.e. block 14 in FIG. 1) includes detecting that a first cluster of pixels and a second cluster of pixels are related to the same star if the distance/displacement (e.g. expressed in terms of number of pixels) between the respective first centroid of said first cluster of pixels and the respective second centroid of said second cluster of pixels is less than a second predefined threshold (e.g. a second threshold defined as a second predefined number of pixels, conveniently greater than said first predefined number of pixels).

Alternatively, the method conveniently comprises:

for each first cluster of pixels, identifying a respective star represented in the first image by said first cluster of pixels (for example, by means of a comparison with a predefined star catalogue); and for each second cluster of pixels, identifying a respective star represented in the second image by said second cluster of pixels (for example, by means of a comparison with said predefined star catalogue);

wherein the step f) (i.e. block 14 in FIG. 1) includes detecting that a first cluster of pixels and a second cluster of pixels are related to the same star if the same star has been identified for both the clusters of pixels.

Preferably, the step j) (i.e. block 18 in FIG. 1) includes estimating the angular velocity of the space platform based on a predefined first-order finite-difference mathematical model relating the angular velocity of the space platform to the first, second, and third star versors using predefined weights related to estimated magnitudes of the stars represented by the first and second clusters of pixels.

The present invention also concerns a method for estimating not only the angular velocity, but also an attitude of the space platform. In particular, a method for estimating an angular velocity and an attitude of a space platform (e.g. a satellite, space vehicle, spacecraft, or space station, etc.) equipped with at least one star tracker, according to a preferred embodiment of the present invention comprises:

k1) carrying out the method 1, thereby obtaining the angular velocity estimate $\hat{\omega}$ related to the first time instant $t_k$;

k2) estimating an attitude of the space platform based on the first and second images acquired, thereby obtaining an attitude estimate $\hat{q}$ related to the first time instant $t_k$; and k3) inputting the angular velocity and attitude estimates $\hat{\omega}, \hat{q}$ into a predefined Kalman filter configured to correct said angular velocity and attitude estimates $\hat{\omega}, \hat{q}$, thereby obtaining refined angular velocity and attitude estimates related to the first time instant $t_k$; wherein said predefined Kalman filter is configured to correct said angular velocity and attitude estimates $\hat{\omega}, \hat{q}$ by applying a predefined kinematic model to a refined attitude estimate obtained for a third time instant $t_{k-1}$ prior to said first time instant $t_k$.

Preferably, the step k2) includes determining the attitude estimate based on:
- the centroids of the pairs of clusters of pixels of the first predefined type; and/or
- the sampling points of the interpolation polynomials interpolating the pairs of clusters of pixels of the second predefined type.

The method for estimating the angular velocity and attitude of the space platform preferably comprises:
- using a plurality of star trackers for acquiring images asynchronously, so that each star tracker acquires images at time instants other than the ones at which the other star tracker(s) acquire (s) images; and,
- for each pair of consecutive images acquired over time by the same star tracker, carrying out the steps b)-j) of the method 1 and the steps k2) and k3) of said method for estimating the angular velocity and attitude of the space platform.

Conveniently, the above-mentioned methods for estimating the angular velocity and/or attitude of the space platform may be carried out by means of one or more electronic processing units (e.g. of the Field Programmable Gate Array (FPGA) or Application Specific Integrated Circuit (ASIC) type) that may be integrated directly into, or connected to, the star tracker(s) (e.g. may be conveniently integrated into a guidance and/or navigation and/or attitude control system installed on board the space platform).

For a better understanding of the present invention, a specific, preferred (but absolutely non-limiting, nor binding) embodiment of said invention will be described in detail below.

As explained above, the need to have gyroscopes on board a space platform is only linked to the angular velocity information that such devices are able to provide with extreme accuracy. On the other hand, the present invention makes it possible to control the attitude and/or guidance and/or navigation of a space platform (e.g. a satellite, space vehicle, a spacecraft, or space station) even without the use of gyroscopes, since the angular velocity is estimated directly based on information provided by one or more star trackers (or, more generally, one or more optical sensors) installed on board the space platform.

In fact, the star trackers are also able to provide, for a given time instant, the star versors related to the observed stars, in addition to the attitude information. As is well known, star versors can be defined as unit vectors measured from the optical lens of a star tracker and directed along a star-lens path in the star tracker reference system.

Figure 2:
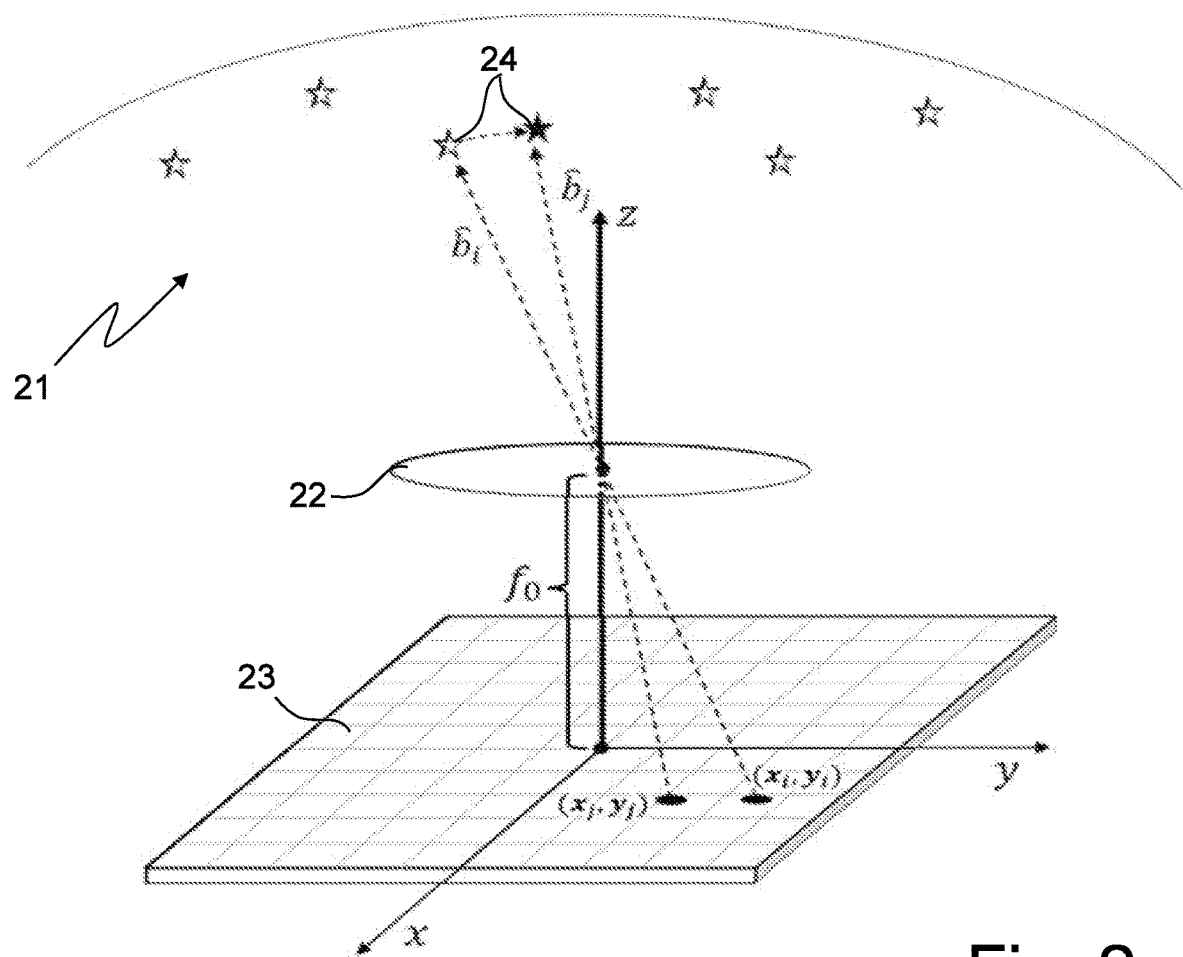
FIG. 2 schematically shows an example of two star versors determined for the same star observed by a star tracker at two successive time instants.

In this regard, FIG. 2 schematically shows an example of two star versors determined for the same star observed by a star tracker at two successive time instants $t_k$ and $t_{k+1}$. In particular, FIG. 2 shows a plurality of stars 21 observed by a star tracker in a respective Cartesian xyz reference system, wherein the star tracker includes an optical lens 22 arranged at a focal distance $f_0$ from a focal plane (or image plane) 23 of said star tracker. The same star 24 observed by the star tracker in two successive time instants $t_k$ and $t_{k+1}$ (i.e. in two images acquired by the star tracker and related to two successive time instants $t_k$ and $t_{k+1}$) gives rise to two different star versors $\hat{b}_i$ and $\hat{b}_j$. From the movement of such star versors $\hat{b}_i$ and $\hat{b}_j$, it is possible to obtain an estimate of the angular velocity.

As is well known, the operations carried out by a star tracker at image processing level can typically be divided into two main groups, namely:
1) a preliminary processing (also called pre-processing) in which the pixels with more energy (i.e. having higher intensities) are detected—such pixels have a greater probability of being related to stars; and
2) an aggregating (or "clustering") operation in which the pixels detected in pre-processing are grouped into "clusters" (or groups) that represent possible stars.

Typically, in the aggregating operation, only pixels that are adjacent to at least one vertex are grouped together. For each cluster (or group) of pixels, a centroid is determined based on a weighted average, based on the energy (i.e. intensity) of the pixels in the cluster.

The information resulting from the processing operations just described (specifically, the star versors computed based on the centroids determined for two consecutive images) correspond to the input data that is necessary and sufficient for the execution of the Crassidis method.

Typically, centroids related to the same star in two consecutive images over time can be identified by means of:
- standard approaches related to the so-called tracking operation (i.e., "tracking") of the star tracker (based on the recognition of detected stars); or
- based on the relative distance between the same centroids in two consecutive images (where this second solution is independent of the recognition of the detected stars).

As explained above, the Crassidis method makes it possible to estimate the angular velocity of a space vehicle without the need to know its attitude. The only information that the Crassidis method requires is the star versors that identify the stars present in the field of view of a star tracker, where the stars must be present in two images acquired at two consecutive time instants $t_k$ and $t_{k+1}$.

In particular, for each of the two acquired images, the detected stars are associated, each, to a respective centroid of a respective cluster of pixels representing said star and, therefore, to a respective star versor indicating the position of said respective centroid with respect to the star tracker.

According to Crassidis, it is possible to estimate the angular velocity through the following relationship based on finite differences of the first order:

$$\hat{\omega}(k) = \frac{1}{\Delta t}\left\{\sum_{i=1}^{n}\overline{\sigma}_i^{-2}[\hat{b}_i(k)\times]^T[\hat{b}_i(k)\times]\right\}^{-1}\sum_{i=1}^{n}\overline{\sigma}_i^{-2}[\hat{b}_i(k)\times]^T\hat{b}_i(k+1), \quad (1)$$

where $\hat{\omega}(k)$ indicates the angular velocity estimated for the time instant $t_k$, $\hat{b}_i(k)$ and $\hat{b}_i(k+1)$ indicate the star versors of the $n^{th}$ star at the time instants $t_k$ and $t_{k+1}$, while $\overline{\sigma}_i^2 \equiv 2\sigma_i^2/\Delta t^2$ indicates a variance of an effective measurement error, where the values of $\overline{\sigma}_i^2$ can be conveniently defined to take into account predefined weights (e.g. set by a user) so as to optimise the measurements inputted into the angular velocity estimation. According to a preferred (but absolutely non-limiting, nor binding) aspect of the present invention, in the equation (1) a value of $\overline{\sigma}_i^2$ is conveniently used so as to take into account weights related to the estimated magnitude of the $n^{th}$ star. Thus, the estimated magnitude conveniently becomes the discriminating factor of the various stars, i.e. a reliability index for the measurement of one star compared to another.

The present invention makes it possible to extend the application of the Crassidis method to the measurement of high angular velocities, i.e. greater than 1 degree per second, without upper limits (i.e. as long as stars are detectable), without however requiring any modification of the star tracker's operation, in particular without requiring any increase in the operating frequency of the star tracker (i.e. the frequency of image acquisition), contrary to what Singla teaches and also what is reported in U.S. Pat. No. 9,073,648 B2. Precisely because of this feature, the present invention has a minimal impact on the on-board electronics or, in any case, much less than that of the Singla methods and of U.S. Pat. No. 9,073,648 B2, which, in contrast, requires a substantial increase in the performance of the star tracker.

Let's consider, thence, the operating frequency (i.e. Of image acquisition) of the star tracker to be fixed, which is equivalent to fixing an acquisition (or exposure) time of each image equal to a constant value $T_{exp}$.

The present invention teaches how to properly handle stars observed by a star tracker that, when the angular velocity of a space platform is high, typically appear in the form of strips. In fact, when a space platform is stationary or moves at angular velocities close to zero, over time $T_{exp}$ the stars impress traces, substantially in the shape of circular marks, on the star tracker detector. On the contrary, when the angular velocity of a space platform is high (in particular, greater than 1 degree per second), in the acquisition time $T_{exp}$ the stars impress traces substantially in the shape of strips on the detector. In this case, the Crassidis method fails because the measurement accuracy decreases.

Figure 3:
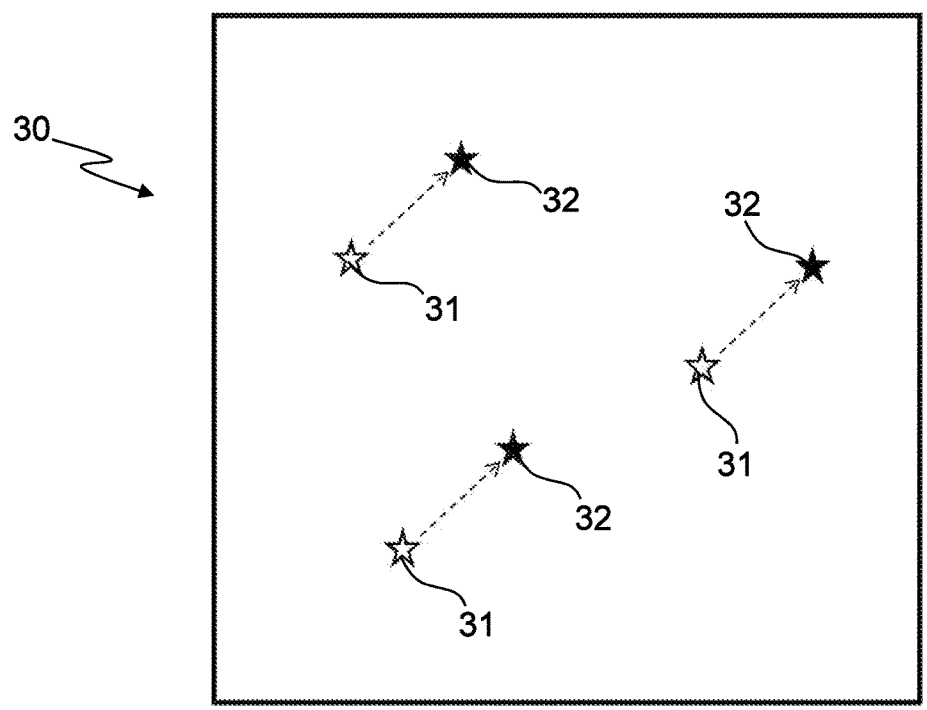
FIGS. 3 and 4 schematically show two examples of synthetic star images (i.e. obtained, each, based on a respective pair of consecutive images acquired over time by a star tracker) in the case of two different angular velocities of a space platform.
Figure 4:
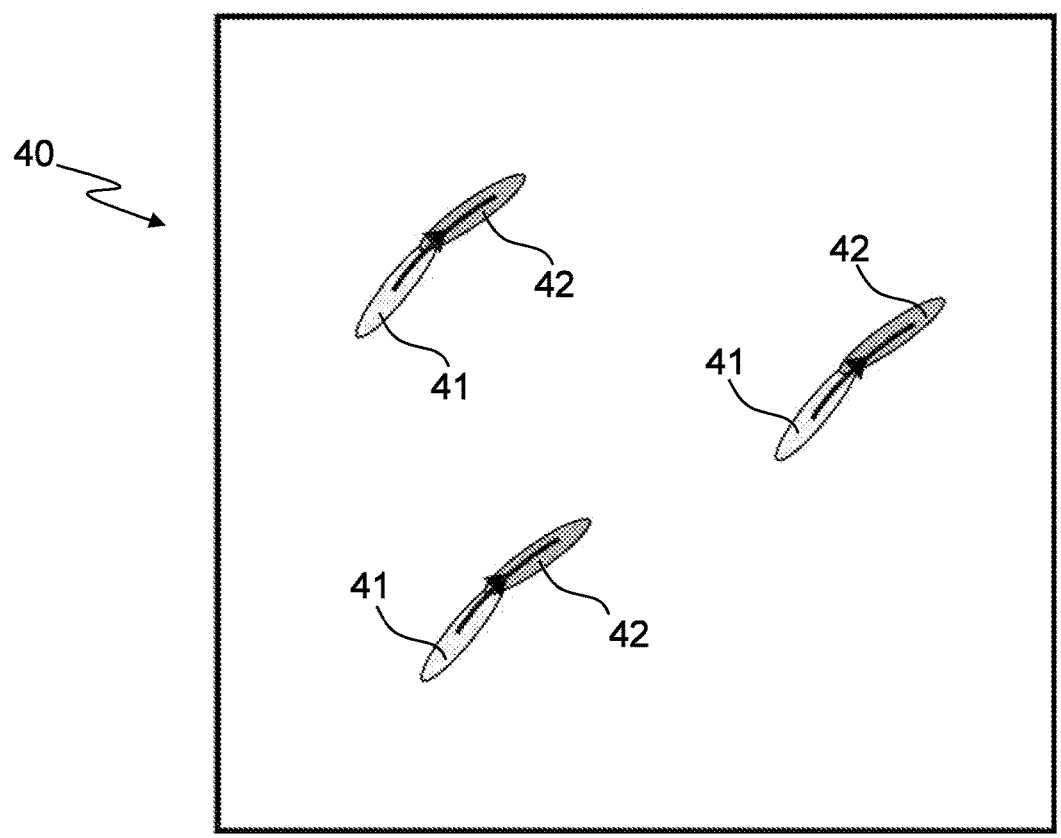

In this regard, FIGS. 3 and 4 schematically show two examples of synthetic star images (i.e. obtained by merging two images acquired by a star tracker and related to two successive time instants $t_k$ and $t_{k+1}$) in the case of two different angular velocities of a space platform. In particular, FIG. 3 shows a first synthetic star image (indicated, as a whole, by the number 30) where the angular velocity is less than 1 degree per second and in which the stars appear as circumscribed marks. Here, the number 31 indicates stars (for simplicity of illustration, represented in a stylised form) observed at a first time instant $t_k$ and the number 32 indicates corresponding stars (again, represented in a stylised form) observed at a second time instant $t_{k+1}$. Instead, FIG. 4 shows a second synthetic star image (indicated, as a whole, by the number 40) where the angular velocity is greater than 1 degree per second and in which the stars appear as strips. Here, the number 41 indicates first strips related to stars observed at a first time instant $t_k$ and the number 42 indicates second strips related to the same stars observed at a second time instant $t_{k+1}$.

The trace of a star is conveniently recognised as a strip depending on the displacement of the centroids in two consecutive images. In particular, given two centroids of the same star in two consecutive images, the distance between these centroids is readily evaluated, since it is directly related to the angular velocity. If the distance exceeds a predefined threshold value (e.g. set by a user), then the star signal is recognised as a strip and treated as such.

Strips belonging to the same star and detected in two consecutive images are joined using a polynomial interpolation technique, thus performing a strip merging operation. Conveniently, said strip merging operation includes:
assuming that the strips belong to the same star because they are very close together (for example, the strips touch or are closer than a threshold value in pixels— e.g. expressed in terms of a predefined number of pixels); and
confirming merging by means of polynomial interpolation.

As explained above, if the centroids of two clusters of pixels related to the same star in two consecutive images are closer than a predefined threshold, then polynomial interpolation is not carried out because the two clusters of pixels are interpreted as two traditional circular marks (i.e. of the type already handled by the Crassidis' method) that can be conveniently joined on a purely geometric basis. If, on the contrary, interpolation has been successfully performed, then we obtain a polynomial that generalises the idea of "centroid" of the traditional case according to Crassidis. In fact, in the latter case the interpolation polynomial can be identified as the location of the points covered by the star during the acquisition time (or, equivalently, the exposure time) of the two images (i.e. $2T_{exp}$).

The interpolation polynomials of the strips are, thus, sampled so as to identify intermediate points. This step gives results equivalent to an increase in the frequency of image acquisition by the star tracker (as required by techniques according to Singla and U.S. Pat. No. 9,073,648 B2), but only requires an "effort" at software level, without any hardware modification.

Figure 5:
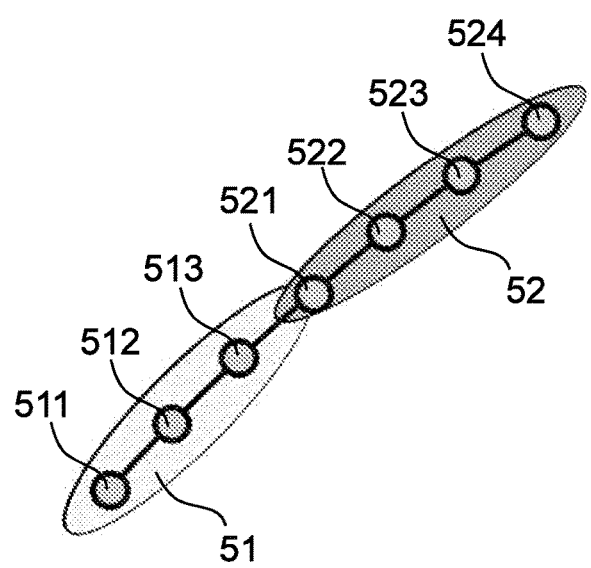
FIG. 5 schematically shows an example of a sampling of two strips related to the same star in two consecutive images over time according to one aspect of the present invention.

In this respect, FIG. 5 schematically shows an example of sampling two strips related to the same star in two consecutive images over time, wherein:
a first strip 51 observed at a first time instant $t_k$ is sampled at three points 511, 512, 513; and
a second strip 52 observed at a second time instant $t_{k+1}$ is sampled at four points 521, 522, 523, 524.

For all the points identified by means of the sampling of the polynomials of interpolation of the strips, respective stellar versors are then computed, which are then used for the angular velocity estimation in accordance with what the equation (1) according to Crassidis teaches.

Therefore, with the present invention, a greater number of stellar versors is taken into consideration for a single star than the canonical two that are taken into consideration in the Crassidis method. In this way, with the same operating frequency of the star tracker, more information is available for the angular velocity estimation (remembering that, like in the algorithm according to Crassidis, two consecutive images over time are taken into account to obtain the information on the orientation and direction of motion). It is, therefore, possible to improve the accuracy and precision of the estimation.

For the sampling of strips, the sampling criterion can be conveniently based on the average length of the strips in the two consecutive images. Preferably, all the strips in the same image have the same number of sampling points so that the time interval between one sampling point and the next is the same for all the strips considered. However, the total number of sampling points, into which each pair of strips related to the same star is subdivided, may, conveniently, be a parameter that a user selects (e.g. a law of variation of the number of sampling points, according to the average length of the strips, may conveniently be introduced). This overall number may be conveniently chosen as a compromise between a minimum number of sampling points, so as to obtain an estimate of the angular velocity that meets predefined system requirements, and a maximum number of sampling points, above which the computational "effort" may exceed the limits allowed.

In other words, an interpolation polynomial interpolating a first strip (related to a first time instant $t_k$) and a second strip (related to a second time instant $t_{k+1}$) related to the same star is sampled at P sampling points (with P=N+M), in particular N sampling points for the first strip and M sampling points for the second strip. Using a mathematical formalism, we can say that $N \geq 1$, $M \geq 1$, and $P=N+M>2$ (for example, in the example of FIG. 5 N=3, M=4, and P=7, while in the Crassidis method it is always the case that N=1, M=1, and P=2). The numbers of sampling points P, N, and M are the same for all interpolation polynomials interpolating the different pairs of strips.

The present invention provides an appropriate combination of the use of circular marks and strips. In particular, in cases where the velocity is such that both circular marks and strips are present in the images, the standard method according to Crassidis is applied to the marks, while the innovative processing according to the present invention based on polynomial interpolation and related sampling is applied to the strips. The choice of the processing method derives from the identification of the star as a strip or mark and, therefore, from the presence or absence of the interpolation polynomial. If the merged object has been interpolated, then the innovative processing, according to the present invention, is used. If, however, the interpolation polynomial has not been computed, then the standard method according to Crassidis is used. Finally, if both methods have been applied to two different clusters of objects in the same pair of images, the final result is, preferably, provided as a weighted average of the two results, where the weights are equivalent to the number of strips and circular marks, respectively.

Once the angular velocity has been estimated in the above manner, the angular velocity estimates and attitude data provided directly by the star tracker, typically in terms of quaternions, are entered into a predefined Kalman filter.

As is well known, Kalman's filter is defined in the literature as a recursive filter that evaluates the state of a dynamic system from measurements affected by noise. Normally, having two measurements available from two different instruments, i.e. the indicative attitude quaternions provided by one or more star trackers and the angular velocity values provided by one or more gyroscopes, Kalman's filter is used to obtain a better attitude estimate by using this information as measurements.

On the contrary, in the case of the present invention, the angular velocity information is also obtained by means of the star trackers, and the purpose of using the Kalman filter is twofold, i.e. the Kalman filter is used not only to improve the attitude estimation, but also to obtain a better estimation of the angular velocity.

According to a preferred (but absolutely non-limiting, nor binding) aspect of the present invention, a predefined Kalman filter model is used that conveniently includes a term related to quaternion kinematics, which corrects any bias affecting the angular velocity estimate when it is constant. When this angular velocity is variable, the term that previously only corrected the bias ensures that the estimated velocity follow the true one. This corrective term stems from the Kalman's filter when comparing the measurements, coming from the star trackers, with the quaternions estimated for a previous time instant $(t_{k+1})$ and propagated until the following instant $(t_k)$. Therefore, this term, which is used within the Kalman filter for estimating angular velocity, has a dual function: it corrects the bias regarding the angular velocity in the case of constant angular velocity and, in addition, it enables the estimated velocity to follow the true velocity in the case of variable angular velocity.

When an attitude measurement arrives from a star tracker, said attitude measurement is immediately processed and fed into the Kalman filter together with the angular velocity estimate. The outputs of the filter, i.e. the attitude and angular velocity, "cleaned" of noise and any bias, are obtained in such a short time that they are considered negligible. Since even the angular velocity estimate is obtained in a very short time, the process can therefore be considered real-time (i.e. executed in real time).

According to a further preferred (but absolutely non-limiting, nor binding) aspect of the present invention, the application of Kalman's filter also takes into account a compensation for the delay between the attitude measurements and the angular velocity estimates. In fact, the indicative attitude quaternions provided by the star tracker are not related to the same time instants to which the angular velocity estimates refer, while for the application of Kalman filtering the attitude measurements and the angular velocity estimates must necessarily refer to the same time instants.

Figure 6:
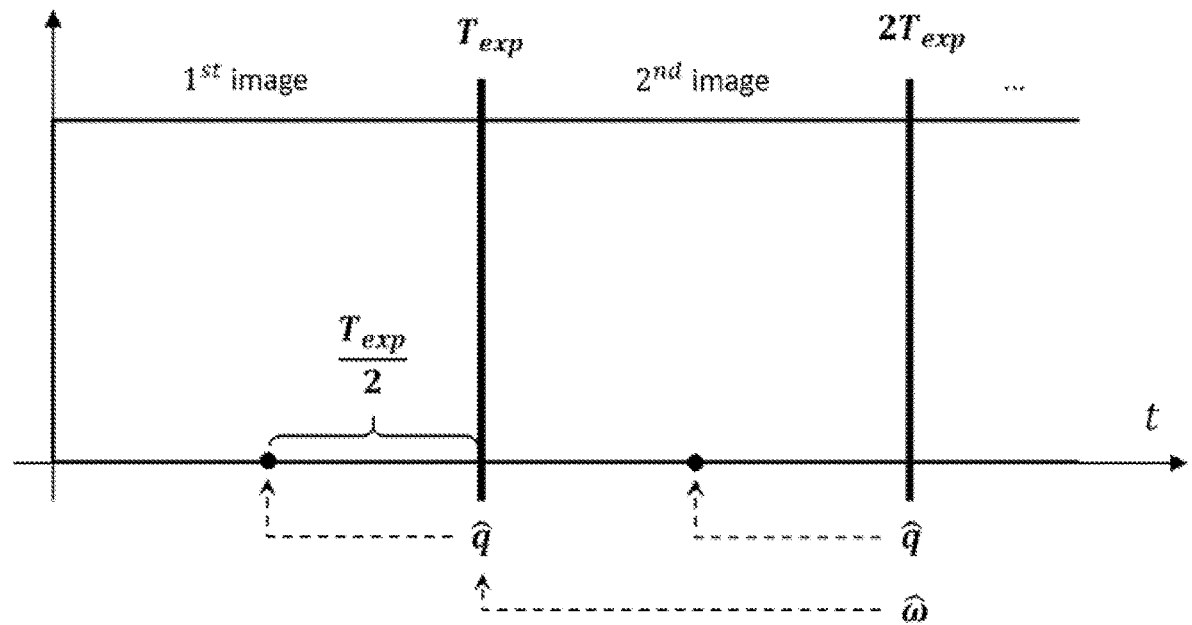
FIG. 6 shows a time diagram related to the acquisition of two images by a star tracker.

For a better understanding of what is explained above, FIG. 6 shows a time diagram related to the acquisition of two images by a star sensor, assuming an acquisition (or exposure) time of each image equal to $T_{exp}$ and an image acquisition frequency equal to $1/T_{exp}$. As shown in FIG. 6, the measurement of a quaternion $\hat{q}$ is carried out when the acquisition of a single image is finished, but it refers to the instant halfway through the image (i.e. $T_{exp}/2$). The angular velocity estimate $\hat{\omega}$ is, instead, carried out after the acquisition of the second image, but it refers to the instant in which the acquisition of the first image is finished (i.e. at the time $T_{exp}$).

Therefore, there is a half exposure time delay (i.e. $T_{exp}/2$) that must be compensated for. To compensate for this time lag, the centroids with which the attitude (i.e. quaternion) estimation is made are conveniently taken in the intermediate time instant between the two images, i.e. the time instant to which the angular velocity estimate refers. These centroids can be conveniently taken as the average of the centroids in the two consecutive images and/or the strips' interpolation polynomial sampling points in the two consecutive images.

Figure 7:
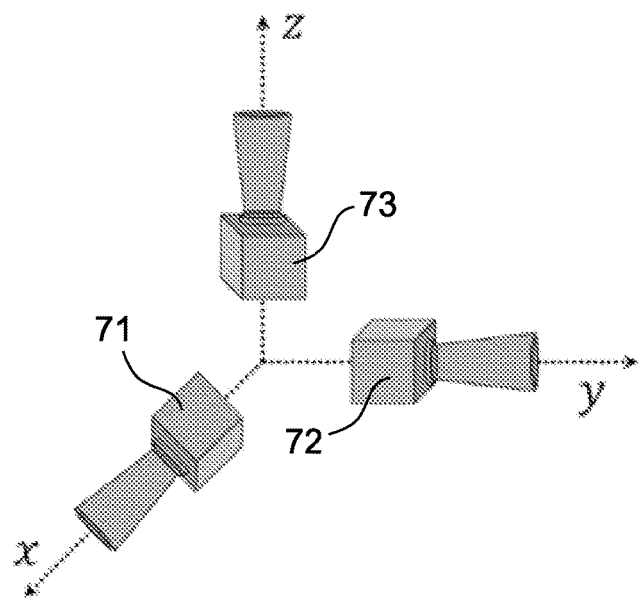
FIG. 7 schematically shows an example of "multi-head" architecture wherein three star trackers are used.

According to yet another preferred (but absolutely non-limiting, nor binding) aspect of the present invention, two or more star trackers (with so-called "multi-head" architecture, i.e. with two or more optical heads, or with two or more star trackers) are preferably used. In this respect, FIG. 7 schematically shows an example of multi-head architecture in which three star trackers 71, 72, 73 oriented along three perpendicular axes x, y, z are used.

Figure 8:
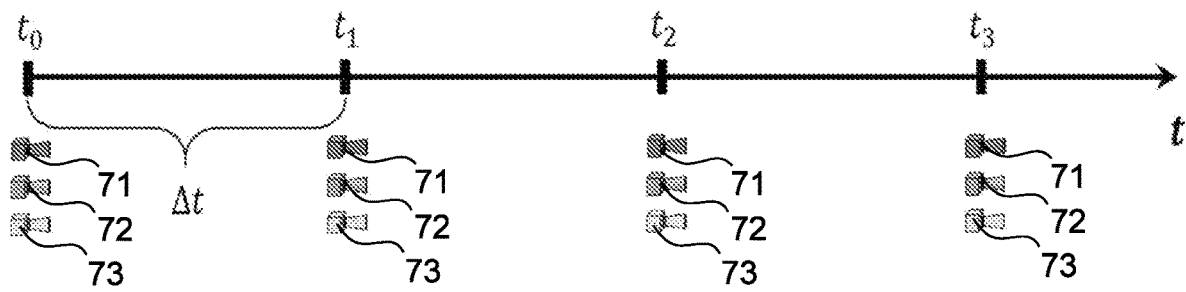
FIG. 8 schematically shows an example of synchronous operation of the three star trackers of the "multi-head" architecture in FIG. 7.

Generally, a plurality of star trackers is used to obtain different measurements synchronously, i.e. that refer to the same time instant, in order to compensate for errors along the aiming axis of each star tracker. The three measurements, one for each star tracker, are then processed simultaneously with a step that depends on the acquisition frequency of the star trackers. Assuming, therefore, the use of the maximum acquisition frequency $1/T_{exp}$, the time between one measurement and the next is equal to $\Delta t = T_{exp}$. In this respect, FIG. 8 schematically shows an example of synchronous operation of the three star trackers 71, 72, 73 of the multi-head architecture in FIG. 7.

Figure 9:
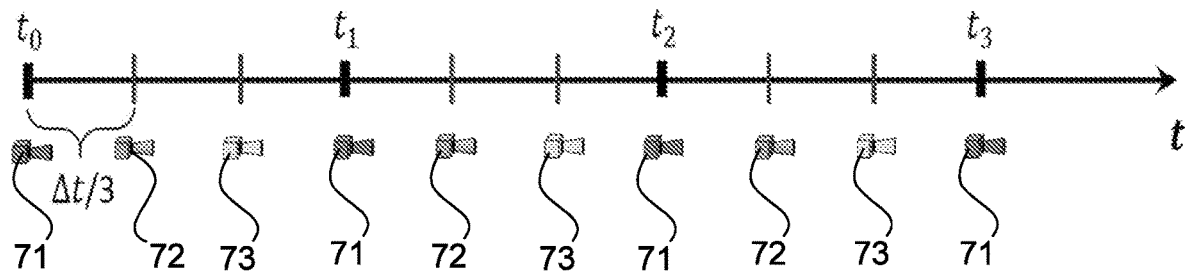
FIG. 9 schematically shows an example of asynchronous operation of the three star trackers of the "multi-head" architecture in FIG. 7, according to a preferred embodiment of the present invention.

Instead, in the case of multi-head architecture according to the above-mentioned, further, preferred (but absolutely non-limiting, nor binding) aspect of the present invention, the star trackers are used asynchronously (i.e. in such a way that the acquisitions/measurements carried out by the different star trackers are shifted in time), thus obtaining an overall acquisition frequency higher than in the synchronous case. In fact, in this way, acquisitions/measurements are processed separately, which results in more data referring to different time instants. This configuration can be called "multi-head" and "multi-phase" and makes it possible to have more data over the same time and, therefore, a better estimation of the angular velocity and attitude. In this regard, FIG. 9 schematically shows an example of asynchronous operation (based on said multi-head and multi-phase configuration) of the three star trackers 71, 72, 73 of the multi-head architecture in FIG. 7.

From the above description, the innovative features and technical advantages of the present invention are immediately apparent to a person skilled in the art.

In particular, it is important to emphasise the fact that the present invention makes it possible to estimate the angular velocity (and, preferably, also the attitude) of a space platform (e.g. a satellite, space vehicle, spacecraft, or space station) in an extremely accurate, precise, and reliable manner based on information provided only by one or more optical sensors (preferably, one or more star trackers), irrespective of the operating frequency of the optical sensor(s) (or of the star tracker(s)) and with an accuracy and precision of angular estimation of velocity (and, preferably, also of attitude) that renders the use of gyroscopes unnecessary (with all the associated advantages in terms of lower costs, smaller dimensions, less complexity of guidance, navigation, and attitude control systems etc.).

In conclusion, it is important to note that, although the invention described above makes particular reference to a very precise embodiment, it is not to be considered limited to that embodiment, since it covers all those variants, modifications, or simplifications covered by the attached claims (such as, for example, solutions based on the use of other types of optical sensors such as one or more colour and/or black and white cameras or video cameras, one or more infrared sensors, etc.).

The invention claimed is:

1. Method for estimating an angular velocity of a space platform equipped with at least one optical sensor, comprising:
   a) acquiring, using an optical sensor, a first image and a second image, wherein the first image is related to a first time instant and the second image is related to a second time instant subsequent to the first time instant;
   b) identifying, based on intensities of pixels in the first image acquired, a first plurality of clusters of pixels related, each, to a respective star;
   c) determining, for each of the first plurality of clusters of pixels, a respective first centroid;
   d) identifying, based on intensities of pixels in the second image acquired, a second plurality of clusters of pixels related, each, to a respective star;
   e) determining, for each of the second plurality of clusters of pixels, a respective second centroid;
   f) detecting pairs of clusters of pixels, wherein each pair of clusters of pixels includes a respective first cluster of pixels in the first image and a respective second cluster of pixels in the second image, and the first cluster of pixels and the second cluster of pixels are both related to one and the same star;
   g) for each pair of clusters of pixels detected, detecting whether said pair of clusters of pixels is of a first predefined type or of a second predefined type;
   h) for each pair of clusters of pixels of the first predefined type, computing
      a respective first star versor based on the respective first centroid of the respective first cluster of pixels, and
      a respective second star versor based on the respective second centroid of the respective second cluster of pixels;
   i) for each pair of clusters of pixels of the second predefined type,
      performing a polynomial interpolation of the first cluster of pixels of the pair and the second cluster of pixels of the pair thereby obtaining a respective interpolation polynomial, which interpolates the respective first cluster of pixels and the respective second cluster of pixels, sampling said respective interpolation polynomial in a plurality of sampling points and,
      computing a plurality of third star versors, wherein each of the plurality of third star versors is associated with one of the plurality of sampling points;
   j) estimating an angular velocity of the space platform based on the first versor, the second versor and the plurality of third star versors if computed, thereby obtaining an angular velocity estimate related to the first time instant.

2. The method of claim 1, wherein the step g) includes detecting that a pair of clusters of pixels is of the first or second predefined type based on a distance/displacement between the respective first centroid of the respective first cluster of pixels and the respective second centroid of the respective second cluster of pixels.

3. The method of claim 2, wherein the step g) includes detecting that a pair of clusters of pixels is of the first or second predefined type if the distance/displacement between the respective first centroid of the respective first cluster of pixels and the respective second centroid of the respective second cluster of pixels is, respectively, smaller or greater than a first predefined threshold.

4. The method according to claim 1, wherein the step f) includes detecting that a first cluster of pixels and a second cluster of pixels relate to one and the same star based on a distance or a displacement between the respective first centroid of said first cluster of pixels and the respective second centroid of said second cluster of pixels.

5. The method of claim 4, wherein the step f) includes detecting that a first cluster of pixels and a second cluster of pixels relate to one and the same star if the distance/displacement between the respective first centroid of said first cluster of pixels and the respective second centroid of said second cluster of pixels is smaller than a second predefined threshold.

6. The method according to claim 1, further comprising:
   for each first cluster of pixels, identifying a respective star represented in the first image by said first cluster of pixels; and
   for each second cluster of pixels, identifying a respective star represented in the second image by said second cluster of pixels;
   wherein the step f) includes detecting that a first cluster of pixels and a second cluster of pixels relate to one and the same star if one and the same star has been identified for both the clusters of pixels.

7. The method according to claim 1, wherein the step j) includes estimating the angular velocity of the space platform based on a predefined first-order finite-difference mathematical model relating the angular velocity of the space platform to the first, second and third star versors using predefined weights related to estimated magnitudes of the stars represented by the first and second clusters of pixels.

8. Method for estimating an angular velocity and an attitude of a space platform equipped with at least one optical sensor, comprising:
   k1) carrying out the method claimed in claim 1, thereby obtaining the angular velocity estimate related to the first time instant;
   k2) estimating an attitude of the space platform based on the first and second images acquired, thereby obtaining an attitude estimate related to the first time instant; and
   k3) inputting the angular velocity and attitude estimates into a predefined Kalman filter configured to correct said angular velocity and attitude estimates, thereby obtaining refined angular velocity and attitude estimates related to the first time instant; wherein said predefined Kalman filter is configured to correct said angular velocity and attitude estimates by applying a predefined kinematic model to a refined attitude estimate obtained for a third time instant prior to said first time instant.

9. The method of claim 8, wherein the step k2) includes determining the attitude estimate based on:
the centroids of the pairs of clusters of pixels of the first predefined type; and/or
the sampling points of the interpolation polynomials interpolating the pairs of clusters of pixels of the second predefined type.

10. The method according to claim 8, further comprising:
using a plurality of optical sensors for acquiring images asynchronously, so that each optical sensor acquires images at time instants different from the ones at which the other optical sensor(s) acquire(s) images; and,
for each pair of images consecutive in time acquired by one and the same optical sensor, performing the steps b)-j) and k2)-k3).

11. Electronic processing unit designed to be installed on board a space platform equipped with at least one optical sensor; said electronic processing unit being configured to carry out the method claimed in claim 1.

12. Computer program product, comprising software and/or firmware code portions that are:
loadable into an electronic processing unit designed to be installed on board a space platform equipped with at least one optical sensor; and
such that to cause, when loaded, said electronic processing unit to become configured to carry out the method claimed in claim 1.

13. Electronic processing unit designed to be installed on board a space platform equipped with at least one optical sensor; said electronic processing unit being configured to carry out the method claimed in claim 8.

14. Computer program product, comprising software and/or firmware code portions that are:
loadable into an electronic processing unit designed to be installed on board a space platform equipped with at least one optical sensor; and
such that to cause, when loaded, said electronic processing unit to become configured to carry out the method claimed in claim 8.

15. Space platform equipped with at least one optical sensor and with the electronic processing unit claimed in claim 11.

16. The space platform of claim 15, wherein said space platform is a satellite, a space vehicle, or a space station.

* * * * *